(12) United States Patent
Bokich (10) Patent No.: US 11,738,489 B2
(45) Date of Patent: Aug. 29, 2023

(54) POSITIONING DEVICE WITH MULTI-DIRECTIONAL LOCK

(71) Applicant: Extreme Components L.P., El Paso, TX (US)

(72) Inventor: Michael Steven Bokich, El Paso, TX (US)

(73) Assignee: EXTREME COMPONENTS LP, El Paso, TX (US)

( * ) Notice: Subject to any disclaimer, the term of this patent is extended or adjusted under 35 U.S.C. 154(b) by 437 days.

(21) Appl. No.: 17/025,364

(22) Filed: Sep. 18, 2020

(65) Prior Publication Data

US 2021/0086418 A1 Mar. 25, 2021

Related U.S. Application Data

(60) Provisional application No. 62/902,678, filed on Sep. 19, 2019.

(51) Int. Cl.
| | |
|---|---|
| *B29C 33/30* | (2006.01) |
| *B29C 45/26* | (2006.01) |
| *F16B 7/04* | (2006.01) |
| *B29C 33/20* | (2006.01) |

(52) U.S. Cl.
CPC .......... *B29C 45/2606* (2013.01); *B29C 33/20* (2013.01); *B29C 33/303* (2013.01); *F16B 7/042* (2013.01); *B29C 2045/2604* (2013.01)

(58) Field of Classification Search
None
See application file for complete search history.

(56) References Cited

U.S. PATENT DOCUMENTS

| | | |
|---|---|---|
| 6,953,331 B2 | 10/2005 | Bokich |
| 7,828,542 B2 | 11/2010 | Bokich |
| 9,186,821 B2 | 11/2015 | Bokich |

*Primary Examiner* — Armand Melendez
(74) *Attorney, Agent, or Firm* — Howard & Howard Attorneys PLLC (57) ABSTRACT

A positioning device for aligning and guiding a first half and a second half of a mold together. The positioning device may comprise a housing including identical wall members configured to define a cavity. A first member may be slidably disposed within the cavity defined by the housing. The first member may comprise a base and a plurality of walls extending from said base, wherein the plurality of walls is configured to define a void with an opening opposite the base. The first member may further comprise a post extending from the base opposite the plurality of walls and a ring disposed radially about a portion of the post, wherein the ring is configured to retain the first member within the housing. The positioning device may further comprise a second member comprising a base and a protrusion, wherein the protrusion is configured to matingly engage the void of the member.

13 Claims, 6 Drawing Sheets

POSITIONING DEVICE WITH MULTI-DIRECTIONAL LOCK

RELATED APPLICATIONS

This application claims priority to and the benefit of U.S. Provisional Patent Application No. 62/902,678, filed on Sep. 19, 2019, the entire contents of which are hereby incorporated by reference.

TECHNICAL FIELD

The invention relates generally to a positioning device for aligning and guiding two halves of a mold together. More specifically, but not exclusively, the invention relates to a positioning device having a bearing mechanism to facilitate aligning and guiding the two halves while reducing wear of the positioning device.

BACKGROUND

In a typical molding process, two halves of a mold are closed together to define a cavity and material is injected into the cavity to form a product. During the molding process, the two halves are repeatedly opened and closed to form multiple products. Molding processes are used in many industries. In many of these industries, the products being formed must meet rigorous standards and specifications. Hence, the tolerance for misalignment between the mold halves during the molding process is generally small.

Positioning devices are used to reduce tolerances between the mold halves to form products that meet the appropriate standards and specifications for each industry. A typical positioning device comprises a first member attached to one of the mold halves and a second member attached to the other mold half. The first member has a male portion that engages a female portion of the second member when the mold halves are closed together.

The fit between the male and female portions of the members determines the magnitude of misalignment between the mold halves. In prior art positioning devices, the male portion includes a first pair of bearing surfaces and the female portion includes a second pair of bearing surfaces. The bearing surfaces of the male portion slide against the bearing surfaces of the female portion to provide a better fit when aligning and guiding the mold halves together. As a result, these bearing surfaces are susceptible to wear. Consequently, as demand for higher productivity increases, the speed of the molding process increases, thereby increasing the wear along the bearing surfaces of prior art positioning devices.

Traditionally, when the bearing surfaces become worn, the positioning devices must be replaced in order to maintain proper tolerances. This results in increased cost and unacceptable delays in production. There remains opportunity to improve the positioning device in order to properly align the two halves of the mold while also reducing the size of the positioning device and extending the life of the positioning device.

SUMMARY

Therefore, it is a primary object, feature, and/or advantage of the invention to improve on and/or overcome the deficiencies in the art.

The present invention comprises a positioning device for aligning and guiding a first and a second half of a mold together. The positioning device may comprise a housing configured to define a cavity. The positioning device may further comprise a first member slidably disposed within the cavity defined by the housing, wherein the first member is configured to slide between a first and second position within the housing. The first member may comprise a first base and a plurality of walls extending from said first base, wherein the plurality of walls is configured to define a void with an opening opposite the first base. The first member may further comprise a post extending from the base opposite the plurality of walls. The post may further comprise a ring disposed radially about a portion of the post, wherein the ring is configured to retain the first member within the housing as it slides between the first and second positions. The positioning device may further comprise a second member comprising a base and a protrusion, wherein the protrusion is configured to define an axis of alignment.

It is another object, feature, and/or advantage of the invention to provide a positioning device wherein the walls of the first member comprise a plurality of apertures, and each of said apertures is configured to receive a bearing, roller, ball, or similar device. The bearing, roller, ball, or similar device is configured to rotationally contact the protrusion of the second member when the protrusion is disposed within the void, i.e., the cage.

It is yet another object, feature, and/or advantage of the invention to provide a positioning device further comprising a resilient member configured to operatively engage the first member. The resilient member may be configured to allow the first member to slide within the housing between the first position and the second position. Furthermore, the resilient member may be configured to bias the first member toward the first position when the first member is separated from the second member while also allowing the first member to slide to the second position when the protrusion of the second member is disposed within the void of the first member. The resilient member may comprise a spring configured to engage the ring and/or the post of the first member.

It is a further object, feature, and/or advantage of the invention to provide a positioning device wherein each of the housing and the second base of the second member further comprises a retaining feature. The retaining feature may comprise a protrusion, tab, or the like extending from an outer surface of the housing and/or the second base of the second member. The retaining feature may be configured to engage a receiving feature of a mold base, wherein said retaining feature and the receiving feature matingly engage to secure the housing and/or the second base of the second member to their corresponding mold base.

It is still a further object, feature, and/or advantage of the invention to provide a positioning device wherein the walls of the first member define a female portion and the protrusion of the second member defines a male portion for mating along the alignment axis. The walls of the first member and the protrusion of the second member may be configured as reciprocal shapes, such that the protrusion may be inserted into the void defined by the walls of the first member.

It is still yet a further object, feature, and/or advantage of the invention to provide a positioning device wherein the housing comprises a plurality of wall members and each of the wall members may comprise a locking feature configured to couple the wall member to an adjacent wall member. Each wall member may be configured to slidingly engage each of the adjacent wall members to engage and/or disengage the locking feature to couple a plurality of wall members together to define the cavity.

These and/or other objects, features, and advantages of the invention will be apparent to those skilled in the art. The invention is not to be limited to or by these objects, features and advantages. No single embodiment need provide each and every object, feature, or advantage.

BRIEF DESCRIPTION OF THE DRAWINGS

Advantages of the present invention will be readily appreciated as the same becomes better understood by reference to the following detailed description when considered in connection with the accompanying drawings, wherein.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

Referring to the figures, wherein like numerals indicate like parts throughout several views, a positioning device 1 for aligning and guiding first and second mold halves together is generally illustrated. The mold halves could be used in injection molding processes, metal stamping processes, or any other forming process in which alignment between two portions of the mold is required for operation. In a typical molding operation, several of the positioning devices 1 may be used to align and guide the first and second mold halves together.

Figure 1:
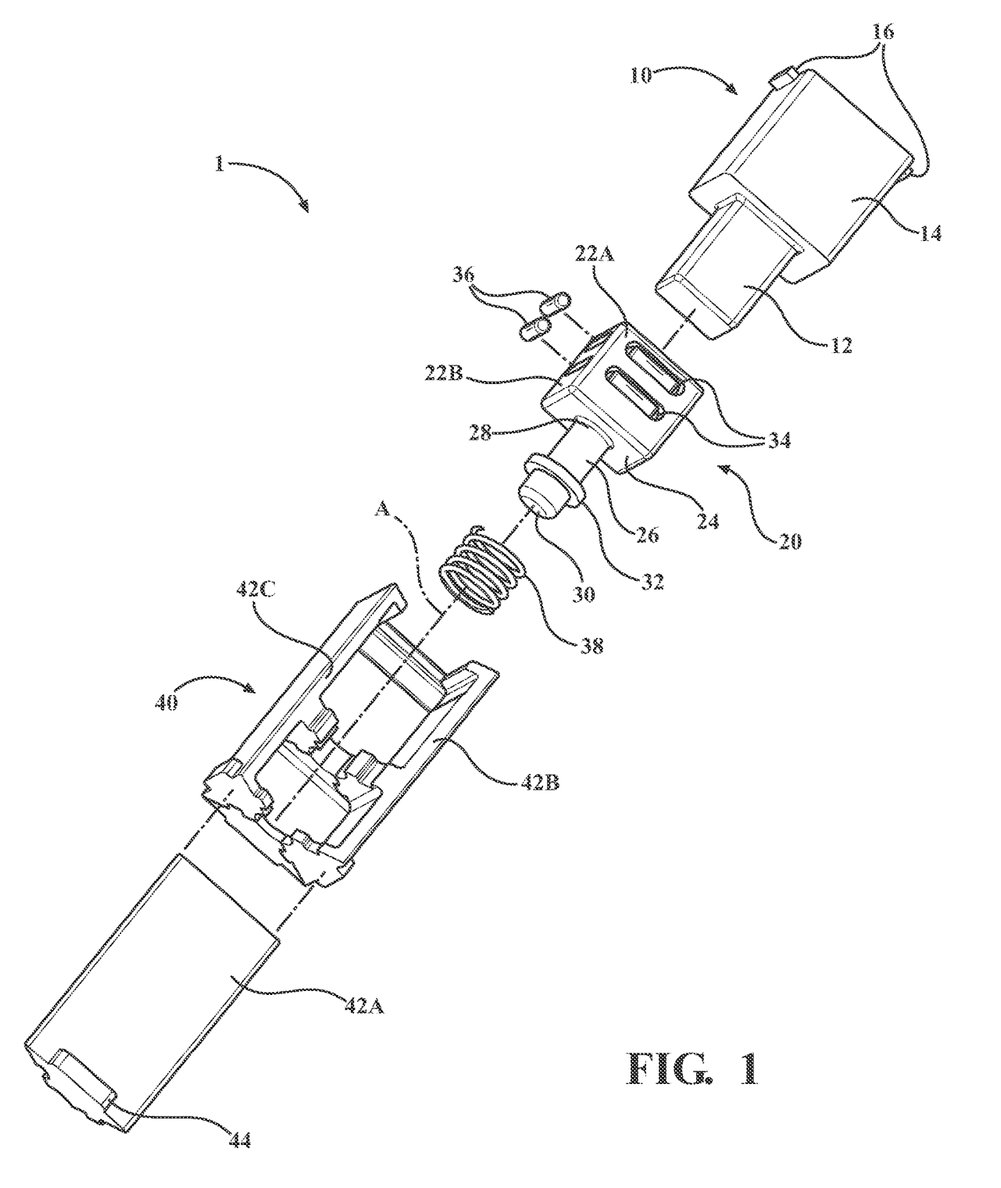
FIG. 1 is an exploded view of a positioning device.
Figure 2:
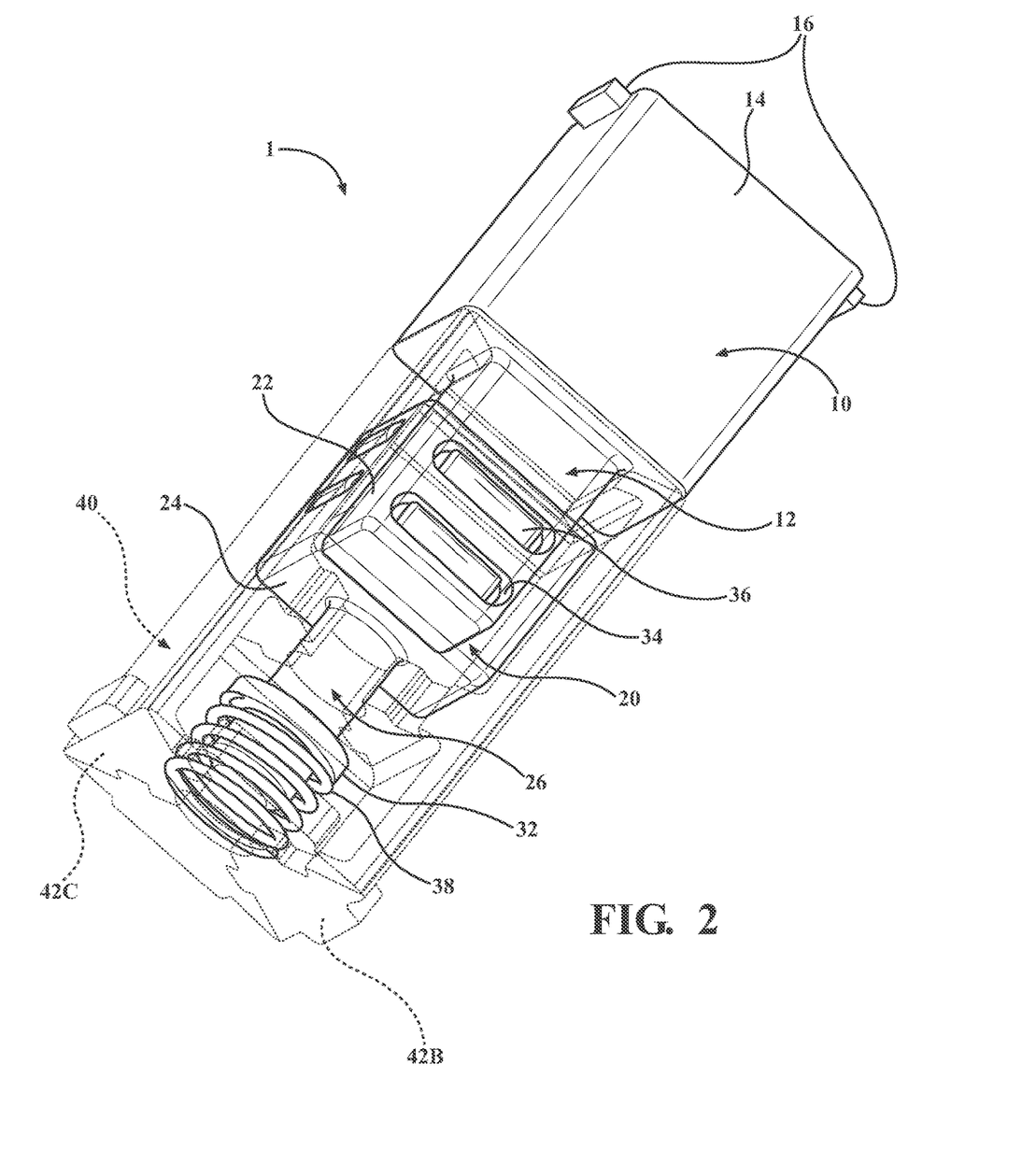
FIG. 2 is an assembled view of the positioning device of FIG. 1, including internal components shown in phantom.

Referring to FIGS. 1 and 2, the positioning device 1 may comprise a second member 10 including a base 14 and a protrusion 12. The protrusion 12 may also be referred to as a post or male portion, and is configured to define an alignment axis A. The alignment axis A may be generally positioned at the center of the face of the protrusion 12 and extending parallel to the longitudinal axis of the protrusion 12. The protrusion 12 and the base may be separate pieces that are coupled together to form the second member 10. Alternatively, the protrusion 12 and the base 14 may be formed from a single piece of material. The prostration 12, as illustrated in FIGS. 1 and 2, is generally configured in a square or rectangular shape. While not illustrated in the Figures, it is contemplated that the protrusion 12 may be configured in a generally circular, oval, triangular, or similar polygonal shape. For example, the protrusion 12 may include a generally triangular profile. The protrusion 12 may also be configured as a cone, wherein the base of the cone is coupled to the base 14 of the second member 10 and configured to taper inward toward the alignment axis as the protrusion 12 extends away from the base 14. One or more tabs 16 may extend from an outer surface of the base 14 and be configured to align and/or secure the second member 10 to a mold half, which will be explained in greater detail below.

The positioning device 1 may further comprise a housing 40. The housing 40 may comprise a plurality of wall members 42A, 42B, 42C that define a cavity within the housing 40. As illustrated in FIGS. 1 and 2, the housing 40 may comprise four wall members 42A, 42B, 42C, and 42D that are generally configured to define a square or rectangular shaped void. Alternatively, while not illustrated in the Figures, it is contemplated that the number and/or the shape of the wall members 42 may be configured to define a generally circular, oval, triangular, or similar polygonal shape. For example, the housing 40 may comprise three wall members 42 to define a generally triangular void. Alternatively, the housing 40 may comprise six wall members 42 to define a generally hexagonal void. One or more tabs 44 may extend from an outer surface of the wall members 42 of the housing 40 and be configured to align and/or secure the housing to a mold half, which will be explained in greater detail below.

The positioning device 1 may also comprise a first member 20 configured to be slidably disposed within the cavity defined by the housing 40. The first member 20 may include a base 24 and a plurality of side walls 22A, 22B, extending from said base 24 and configured to define a void for receiving the protrusion 12 of the second member 10. As illustrated in FIGS. 1 and 2, the plurality of side walls 22 may be generally configured to define the void as a square or rectangular shape. The combination of the base 24 and side walls 22 may also be referred to as a cage or female portion. While not illustrated in the Figures, it is contemplated that the plurality of side walls 22 may also be configured in a generally circular, oval, triangular, or similar polygonal shape of the void corresponding to the shape of the protrusion 12 of the second member 10. For example, the plurality of side walls 22 may include a generally triangular profile. The protrusion 12 may also be configured as a cone, wherein the tip of the cone is proximate to the base 24 of the first member 20 and configured to taper outward away from the alignment axis as the side walls 22 extend away from the base 24. While the shape of the void defined by the side walls 22 of the first member 20 may be related to the shape of the cavity defined by the housing 40, it is not required. It is contemplated that the shape of the void defined by the side walls 22 of the first member 20 may be different from the shape of the cavity defined by the housing 40. In this scenario, the shape of the void defined by the side walls 22 may be configured to correspond to the shape of the protrusion 12 of the second member 10, and the outer surface of the side walls 22 of the first member 20 may be configured to correspond to the cavity defined by the housing 40. This is to allow the first member 20 to slide within the housing 40, while also allowing the void to be configured to receive the protrusion 12.

The side walls 22 of the first member 20 may comprise one or more apertures 34 that are configured to rotatably support a roller 36, bearing, needle bearing, ball bearing, or the like. As illustrated in FIGS. 1 and 2, each side wall 22 comprises two apertures 34, each of which receives a roller 36. The rollers 36 may be configured to rotate within the apertures 34. In operation, as the protrusion 12 is inserted and removed from within the void defined by the side walls 22, the rollers 36 slidably engage the protrusion 12. The rotation of the roller 36 assists with insertion and removal of the protrusion 12 from within the void defined by the side walls 22, while also creating proper alignment. As previously mentioned, alignment of corresponding mold halves is important in meeting small tolerances for parts. Therefore, while the protrusion 12 must be separable from the first member 20, the protrusion 12 should fit snugly within the void when the mold halves are brought together.

The first member 20 may also comprise a post 26 including a first end 28 and a second end 30. The post 26 may also be referred to as a stem. The first end 28 of the post 26 may be coupled to the base 24 of the first member 20, such that the post extends away from the base 24 opposite the side walls 22 and terminating at the second end 30. As illustrated in FIGS. 1 and 2, the post 26 comprises a generally round shape. While not illustrated in the Figures, it is contemplated that the post 26 may also be configured in a square, rectangular, or similar polygonal shape. The post 26 may also comprise a ring 32 or protrusion encircling the post 26 at an intermediate point along the post 26 between the first end 28 and the second end 30. The ring 32 is configured to comprise a diameter or outer dimension that is larger than that of the post 26.

The positioning device 1 may further comprise a resilient member 38, such as a spring or similar device. The resilient member 38 may be configured to engage the ring 32 encircling the post 26 and an interior surface of the housing 40. The resilient member 38 may serve to bias the first member 20 in a particular direction along the alignment axis A, while also allowing the first member 20 to move in the opposing direction when a force is applied to the first member 20, such as when the protrusion 12 is inserted within the void when two mold halves are brought together. For example, as illustrated in FIG. 2, the resilient member 38 is compressed when the protrusion 12 is inserted within the void 25 defined by the first member 20 as the second member 10 is moved toward the bottom region of the cavity defined by the housing 40. However, when the protrusion 12 is removed from the void 25, the spring may expand and slidably move the first member 20 toward the opposing region cavity defined by the housing 40.

Referring to FIGS. 3A-3D, various views of the wall member 42 of the housing 40 are illustrated in greater detail. Each of the wall members 42 of the housing 40 may comprise identical features, improving the ability to manufacture the wall members 42 and assembly of the housing 40. The wall member 42 may comprise a top tab 52 that extends inward toward the alignment axis A. The top tab 52 is configured to retain the first member 20 within the housing 40 when assembled. When the wall members 42 are assembled as the housing 40, the top tabs 52 of the adjacent wall members 42 should define an opening in the top of the housing 40. The top opening in the housing 40 defined by the top tabs 52 should be configured such that the top opening is larger than the outer dimension of the protrusion 12 of the second member 10, but also smaller than the outer dimension of the side walls 22 of the first member 20. In operation, the top tabs 52 will define a top opening that allows for insertion of the protrusion 12 into the void of the first member 20, while also serving to retain the first member 20 within the cavity defined by the housing 40.

Figure 3A:
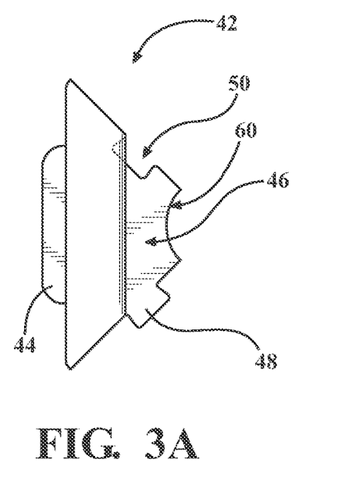
FIG. 3A is a top view of a wall member of a housing of the positioning device.
Figure 3B:
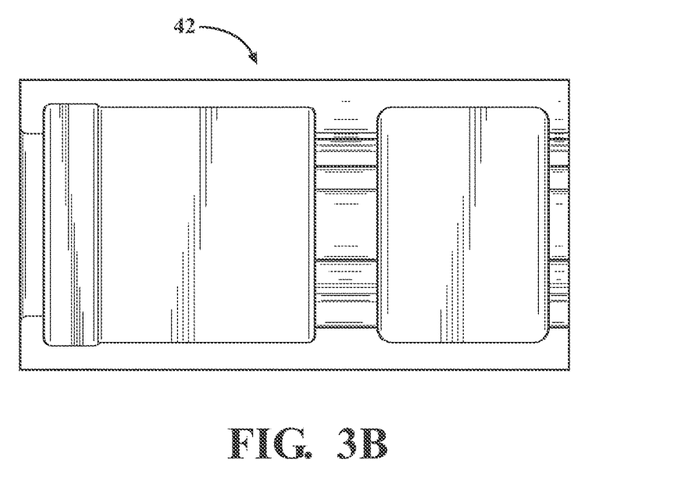
FIG. 3B is a front view of the wall member of the housing of FIG. 3A.
Figure 3C:
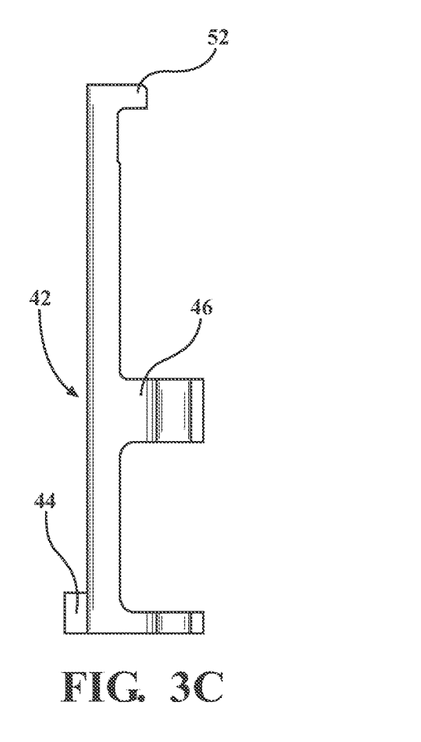
FIG. 3C is a side view of the wall member of the housing of FIG. 3A.
Figure 3D:
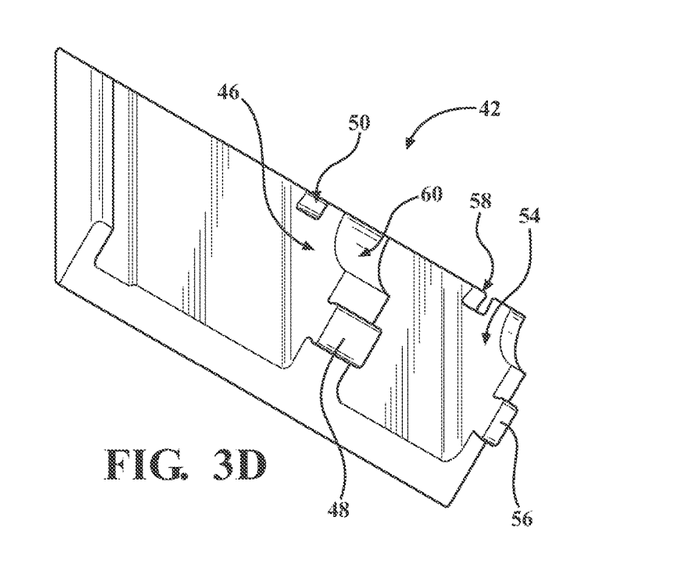
FIG. 3D is a perspective view of the wall member of the housing of FIG. 3A.
Figure 4A:
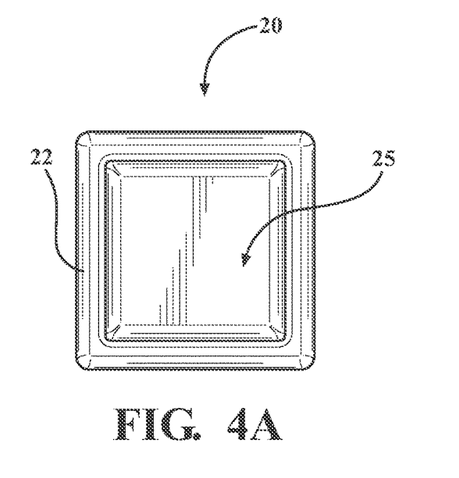
FIG. 4A is a top view of a first member.
Figure 4B:
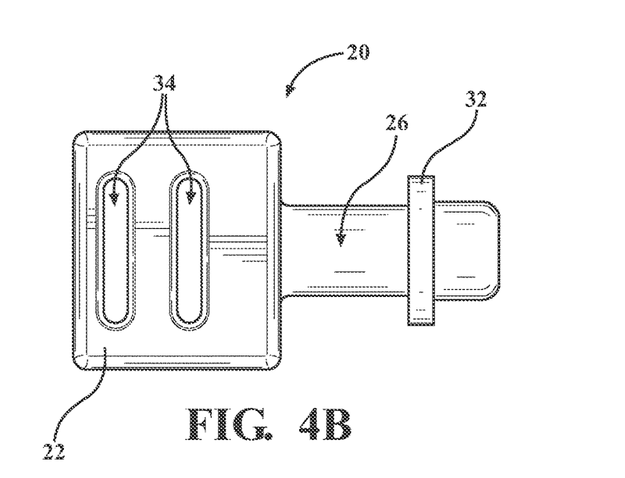
FIG. 4B is a side view of the first member of FIG. 4A.
Figure 4C:
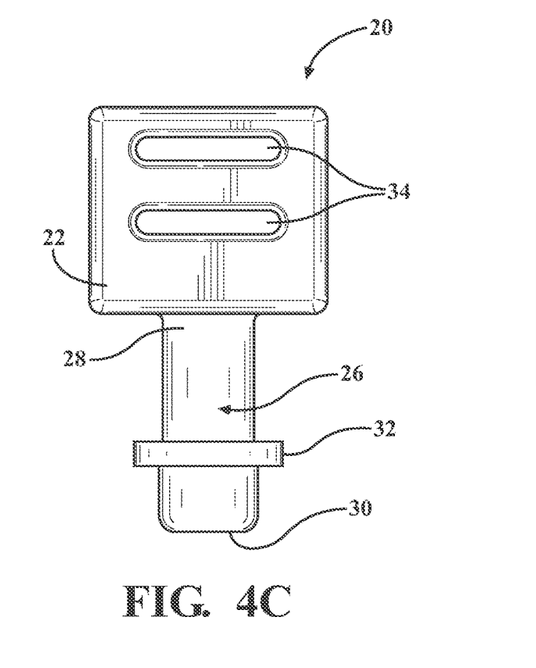
FIG. 4C is an alternate side view of the first member of FIG. 4A.
Figure 4D:
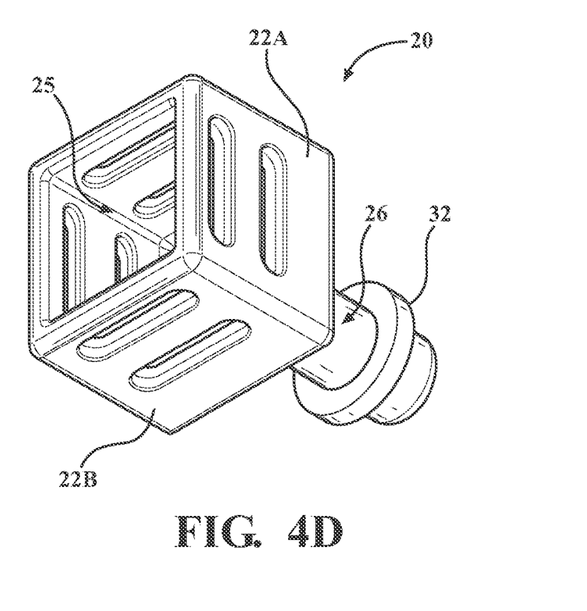
FIG. 4D is a perspective view of the first member of FIG. 4A.

The wall members 42 may also comprise an intermediary tab 46 and a bottom tab 54. Each of the intermediary tab 46 and the bottom tab 54 may comprise a locking feature configured to interlock the wall member 42 to an adjacent wall member 42. As illustrated in FIGS. 3A and 3D, each of the intermediary tab 46 and the bottom tab 54 comprises a recess 50, 58 and a protrusion 48, 56 positioned on opposing sides of the intermediary tab 46 and the bottom tab 54. The recess 50, 58 of a first wall member 42A is configured to slidably engage with the protrusion 48, 56 of an adjacent wall member 42. As illustrated in FIGS. 3A and 3D, the recess 50, 58 and the protrusion 48, 56 may comprise corresponding tapers to allow the recess 50, 58 and the protrusion 48, 56 to interlock when slidingly engaged. One of many advantages of the interlock feature of the wall members 42 is that the wall members do not require the use of an additional fastening component, such as a weld, bolt, screw or similar fastening member. This can reduce the size of the housing 40, and thus reduce the overall size of the positioning device 1. Alternatively, the recess 50, 58 and the protrusion 48, 56 may be configured in corresponding shapes, such as a circle, oval, triangle, or similar shape that allows the protrusion 48, 56 to be slidably inserted within the recess 50, 58 to couple adjacent wall members 42. In operation, a plurality of wall members 42 will be positioned around the first member 20 and slide together to engage the corresponding recess 50, 58 and protrusion 48, 56 of the adjacent wall members 42 to assemble the housing 40 and enclose the first member 20 within the cavity.

When the housing 40 is assembled, the intermediary tab 46 should be configured to define an intermediary opening or aperture in the center of the housing 40 with the adjacent intermediary tabs 46. The intermediary opening should be configured to receive the post 26 of the first member 20. When the housing 40 is assembled, the intermediary opening should be configured to encircle the post 26 at a position between the base 24 and the ring 32. The intermediary opening is sized to be larger than the diameter or outer dimension of the post 26, but smaller than the diameter or outer dimension of the ring 32. When the housing 40 is assembled, the intermediary opening should be configured to encircle the post 26 at a position between the base 24 and the ring 32. The intermediary opening may serve as a retaining mechanism for the first member 20, with the ring 32 on the post 26 serving to limit the travel of the first member 20 as it slides within the housing 40.

The bottom tab 54 of the wall member 42 may create a solid plate across the bottom of the housing 40 when assembled. Alternatively, the bottom tab 54 of the wall member 42 may also define a bottom opening or aperture in the bottom of the housing 40 when assembled. The bottom tab 54 may be configured to engage the resilient member 38 opposite the ring 32, as illustrated in FIG. 2. This allows the resilient member 38 to bias the first member 20 towards the top region of the housing 40 when the protrusion 12 is separated from the first member 20.

As each of the individual wall members 42 may be configured to have an identical design, this can improve manufacturing of the housing 40. Instead of requiring multiple different components to assemble a housing, the present housing 40 may comprise a plurality of identical wall members 42 that may be mechanically assembled. This prevents any confusion when manufacturing and/or assembling the housing 40, as all of the pieces, i.e., the wall members 42, are the same and are interchangeable.

Referring to FIGS. 4A-4D, various views of the first member 20 are illustrated. As described above with reference to FIGS. 1 and 2, the first member 20 may comprise a plurality of side walls 22 configured to define a void 25. The side walls 22 may be configured such that the size and shape of the void 25 corresponds to the size and shape of the protrusion 12 of the second member 10.

Figure 5:
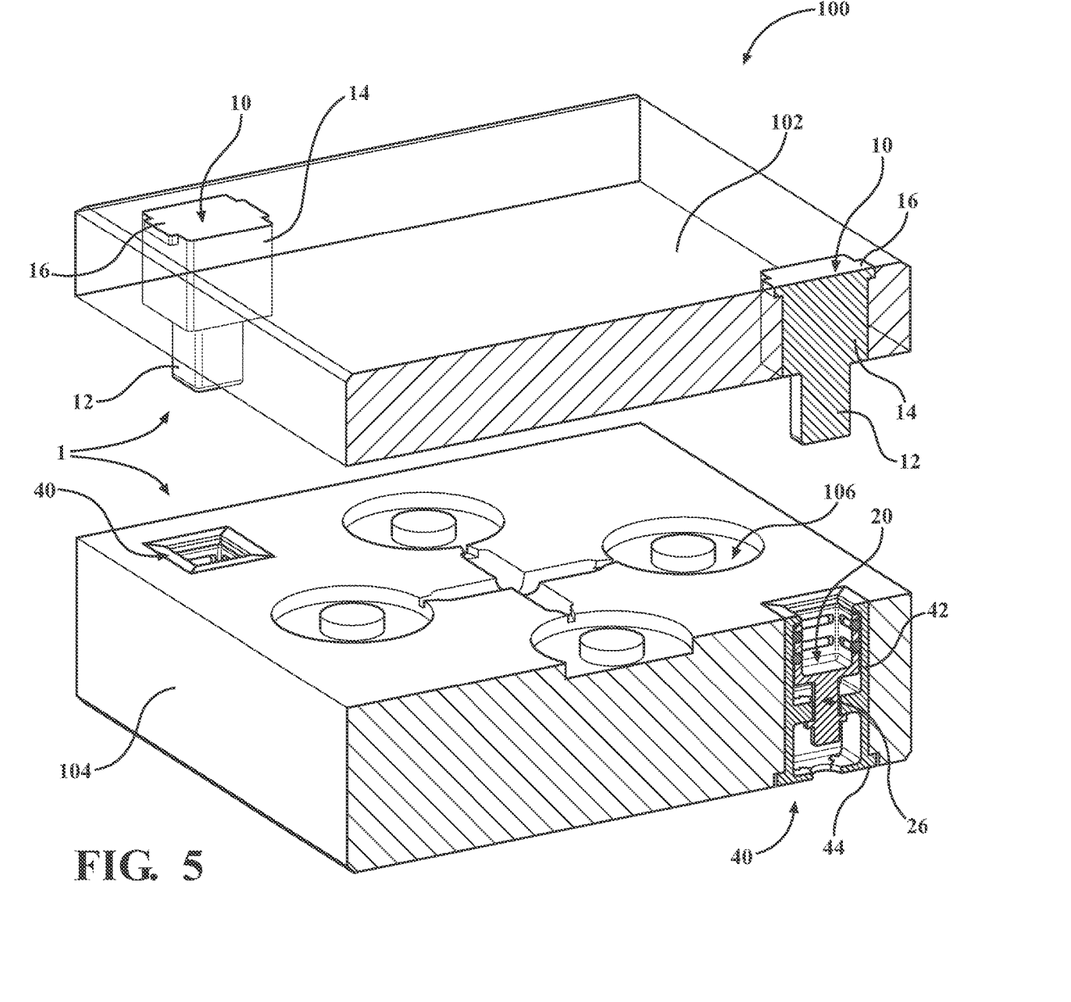
FIG. 5 is a perspective view of a first mold assembly including the positioning device of FIGS. 1 and 2.

Referring to FIG. 5, a mold pod assembly 100 including a pair of positioning devices 1 is illustrated. The mold pod assembly 100 may include a first half 102 and a second half 104 that come together to create a part mold 106. The first half 102 and the second half 104 of the mold pod assembly 100 may comprise corresponding mold openings or apertures configured to receive one of the housing 40 or the second member 10 of the positioning device 1. The mold openings on the opposing first and second halves 102, 104 of the mold pod assembly 100 may be configured such that when the first half 102 and the second half 104 are brought together, the protrusion 12 of the second member 10 may be inserted into the void 25 of the first member 20 to align the part mold 106 of each of the first and second halves 102, 104 of the mold pod assembly 100.

The mold openings for receiving one of the second member 10 or the housing 40 may further comprise a recess that corresponds to the one or more tabs 16, 44 that may extend from the outer surface of the second member 10 and/or the housing 40. The recess may be configured to position the second member 10 and/or the housing 40 within the mold opening. The recess may also secure the second member 10 and/or the housing 40 within the opening when the mold pod assembly 100 is coupled to the mold base. Prior mold alignment devices were bulkier and were coupled to the mold base. The ability to reduce the size of the positioning device 1 described herein allows for the positioning device 1 to be utilized to align halves of individual mold pods, which can allow for the production of molded parts at tighter tolerances.

Figure 6:
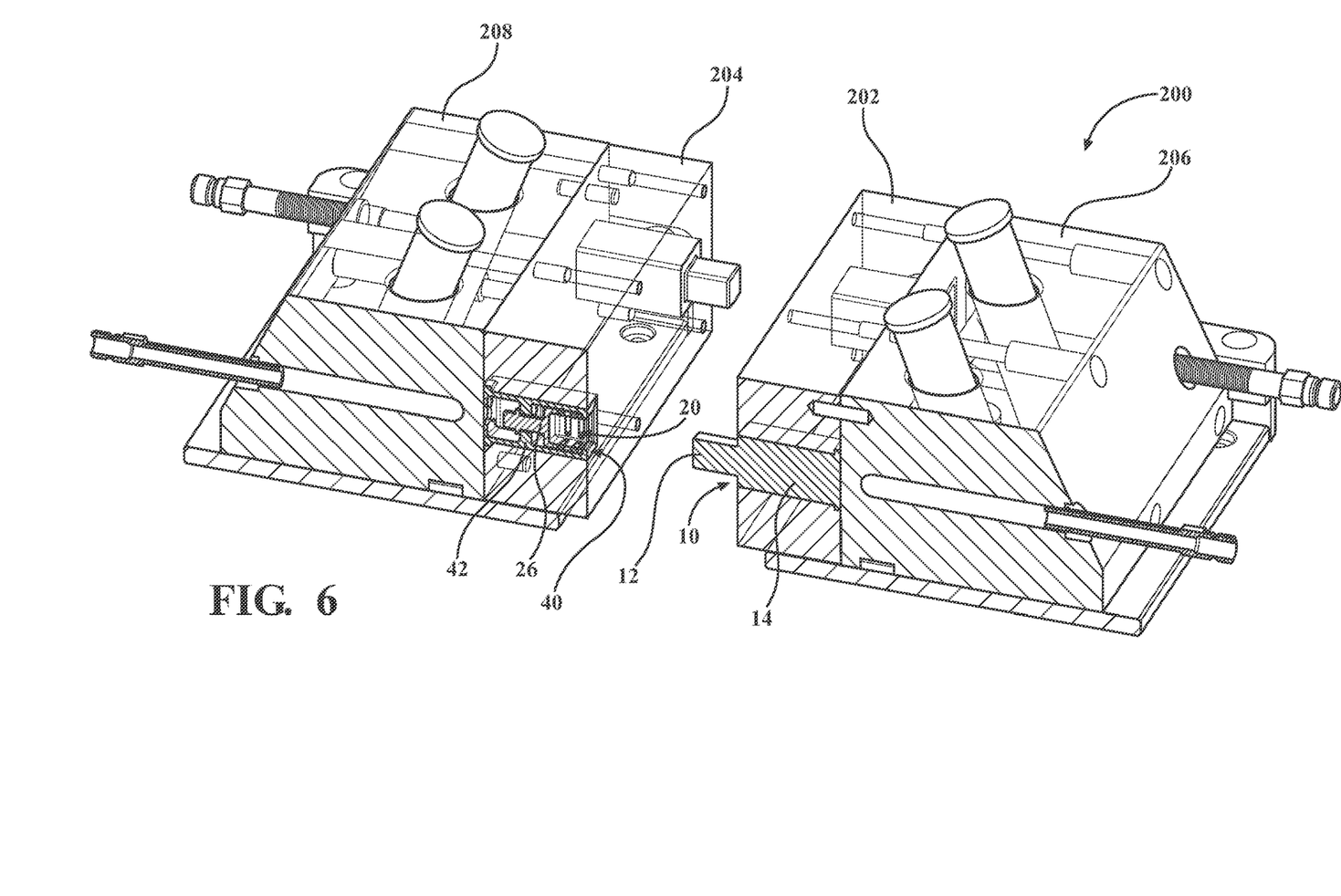
FIG. 6 is a perspective view of a second mold assembly including the positioning device of FIGS. 1 and 2.

Referring to FIG. 6, a mold assembly 200 is illustrated. The mold assembly 200 may comprise a first half 202 and a second half 204 of a mold pod. Each of the halves 202, 204 of the mold pods may be coupled to a corresponding mold base 206, 208. The mold assembly 200 illustrated in FIG. 6 includes a pair of positioning devices 1 to align each of the first half 202 and the second half 204 of the mold pod. The sectioned portion of FIG. 6 illustrates how the tabs 16, 44 extending from the outer surface of the second member 10 and/or the housing 40 secure the corresponding portion of the positioning device 1 in the mold half 202, 204. The protrusion 16, 44 fits in the recess of the mold pod when the second member 10 and/or the housing 40 is inserted in the mold opening from the rear. The protrusion 16, 44 prevents the second member 10 and/or the housing 40 from passing all the way through the mold opening. Then, when the halves 202, 204 of the mold pod are coupled to the corresponding mold base 206, 208, the mold base 206, 208 prevents the second member 10 and/or the housing 40 from sliding out of the halves 202, 204 of the mold pod.

In operation, as the mold halves 202, 204 are brought together, the protrusion 12 is inserted into the void 25 of the first member 20, moving the first member 20 between the first position and the second position. When the protrusion 12 is disposed within the void 25 and the first member 20 is in the second position, the resilient member 38 is compressed between the ring 32 and the bottom tab 54 of the housing 40. The rollers 36 create a snug fit between the protrusion 12 and the first member 20.

Alternatively, when the mold halves 202, 204 are separated, the protrusion 12 is removed from the void 25 of the first member 20. As the protrusion 12 is removed from the void 25, the resilient member 38 expands as the force applied by the protrusion 12 to the first member 20 is removed, moving the first member 20 between the second position and the first position.

One of the numerous advantages of the positioning device 1 described above over prior mold alignment devices is that the structure and design allows the present positioning device 1 to be manufactured in a smaller and more compact design while maintaining durability. This allows for the positioning device 1 to be utilized with individual mold pod assemblies, as opposed to prior designs that were coupled to the mold base, which may include multiple mold pod assemblies. By aligning individual mold pod assemblies instead of the entire mold base, this can allow for the mold pod assemblies to hold tighter tolerances and reduce the amount of machining and/or finishing processes required to produce the final part.

In a typical molding operation, several of the positioning devices 1 may be used to align and guide first and second mold halves together. In addition, each of the embodiments described herein are for illustrative purposes only. Additional embodiments of the present invention can be contemplated that keep with the spirit of the present invention. Obviously, many modifications and variations of the present invention are possible in light of the above teachings. The invention may be practiced otherwise than as specifically described within the scope of the appended claims.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A positioning device for aligning and guiding first and second mold halves together, said positioning device comprising:
   a housing configured to define a cavity, said housing comprising a plurality of wall members configured to interlock with one another to define said cavity;
   a first member disposed within said cavity of said housing, said first member comprising a first base and a plurality of side walls extending from said first base and configured to define a void;
   a plurality of apertures in said plurality of side walls, each of said plurality of apertures configured to receive a roller;
   a post extending from said first base opposite said plurality of side walls, said post having a first and second end wherein said first end is coupled to said first base and said second end is positioned away from said first base;
   a ring encircling said post at an intermediate point on said post between said first end and said second end;
   a resilient member disposed in said housing and configured to engage said ring of said post; and
   a second member comprising a second base and a protrusion extending from said second base, said protrusion configured to define an alignment axis;
   wherein said void is configured to receive said protrusion of the second member;
   wherein each of said rollers is configured to engage said protrusion when disposed in said cavity;
   wherein each of said plurality of wall members further comprises a tab, said tab configured to define a second aperture when said plurality of wall members are assembled as said housing and said second aperture is configured to receive said post, such that said post may slide within said second aperture.

2. The positioning device of claim 1, wherein said housing further comprises a distal end and a proximal end; and
wherein said resilient member is configured to engage said ring to bias said first member towards said distal end of said housing when said second member is disposed outside of said void.

3. The positioning device of claim 2, wherein said resilient member is configured to allow said first member to slide toward said proximal end of said housing when said protrusion of said second member is disposed within said void.

4. The positioning device of claim 1, wherein each of said plurality of wall members is configured to comprise an identical shape.

5. The positioning device of claim 1, wherein each of said plurality of wall members comprises a locking feature configured to slidingly engage said locking feature of an adjacent wall member.

6. The positioning device of claim 1, wherein said second aperture is configured to encircle said post between said first base and said ring; and
said second aperture is sized to be larger than a first diameter of the post and smaller than a second diameter of the ring, such that the second aperture restrains the first member within said housing.

7. The positioning device of claim 1, wherein each of said housing and said second base further comprises a retaining feature on an outer surface, said retaining feature configured to engage a receiving feature of a mold base, wherein said retaining feature and the receiving feature matingly engage to secure said housing and said second base to their corresponding mold base.

8. A positioning device comprising:
a housing configured to define a cavity, said housing comprising a plurality of wall members configured to interlock with one another to define said cavity;
a first member disposed within said cavity, said first member comprising:
a first base and a plurality of side walls extending from said first base and configured to define a void, first base disposed within the housing of the positioning device;
a plurality of apertures in said plurality of side walls, each of said plurality of apertures configured to receive a roller;
a post extending from said first base opposite said plurality of side walls, said post having a first and second end wherein said first end is coupled to said first base and said second end is positioned away from said first base; and
a ring encircling said post at an intermediate point on said post between said first end and said second end;
wherein each of said plurality of wall members further comprises a tab, said tab configured to define a second aperture when said plurality of wall members are assembled as said housing and said second aperture is configured to receive said post, such that said post may slide within said second aperture.

9. The positioning device of claim 8, wherein each of the plurality of wall members is configured to comprise an identical shape including a locking feature configured to slidingly engage the locking feature of an adjacent wall member.

10. A mold assembly including a first half and a second half, said mold assembly comprising:
a housing defined by a plurality of wall members configured to interlock with one another to define a cavity, the housing coupled to the first half;
a first member disposed within said cavity of said housing, said first member comprising a first base and a plurality of side walls extending from said first base and configured to define a void;
a plurality of apertures in said plurality of side walls, each of said plurality of apertures configured to receive a roller;
a post extending from said first base opposite said plurality of side walls, said post having a first and second end, wherein said first end is coupled to said first base and said second end is positioned away from said first base;
a ring encircling said post at an intermediate point on said post between said first end and said second end;
a resilient member disposed in said housing and configured to engage said ring of said post; and
a second member coupled to the second half, said second member comprising:
a second base; and
a protrusion extending from said second base;
wherein said protrusion is configured to define an alignment axis;
wherein said void is configured to receive said protrusion of the second member to align the first half with the second half; and
wherein each of said rollers is configured to engage said protrusion when disposed in said cavity; and
wherein each of said plurality of wall members further comprises a tab, said tab configured to define a second aperture when said plurality of wall members are assembled as said housing and said second aperture is configured to receive said post.

11. The mold assembly of claim 10, wherein said housing further comprises a distal end and a proximal end; and
wherein said resilient member is configured to engage said ring to bias said first member towards said distal end of said housing when said second member is disposed outside of said void.

12. The mold assembly of claim 11, wherein said resilient member is configured to allow said first member to slide toward said proximal end of said housing when said protrusion of said second member is disposed within said void.

13. The mold assembly of claim 10, wherein each of said plurality of wall members is configured to comprise an identical shape including a locking feature configured to slidingly engage said locking feature of an adjacent wall member.

* * * * *